United States Patent
Quint et al.

(10) Patent No.: US 12,306,147 B2
(45) Date of Patent: May 20, 2025

(54) ANALYTICAL SYSTEM AND METHOD INCLUDING SWITCHING BETWEEN LIQUID CHROMATOGRAPHY FLUIDIC STREAMS

(71) Applicants: Roche Diagnostics Operations, Inc., Indianapolis, IN (US); Hitachi High-Tech Corporation, Tokyo (JP)

(72) Inventors: Stefan Quint, München Süd (DE); Tibor Toth, München Süd (DE); Aart Pieter Van Doorn, München Süd (DE); Yuichiro Hashimoto, Tokyo (JP)

(73) Assignees: ROCHE DIAGNOSTICS OPERATIONS, INC., Indianapolis, IN (US); HITACHI HIGH-TECH CORPORATION, Tokyo (JP)

( * ) Notice: Subject to any disclaimer, the term of this patent is extended or adjusted under 35 U.S.C. 154(b) by 281 days.

(21) Appl. No.: 17/965,290

(22) Filed: Oct. 13, 2022

(65) Prior Publication Data
US 2023/0037141 A1    Feb. 2, 2023

Related U.S. Application Data

(63) Continuation of application No. PCT/EP2021/059412, filed on Apr. 12, 2021.

(30) Foreign Application Priority Data

Apr. 15, 2020 (EP) .................................. 20169521

(51) Int. Cl.
*G01N 30/46* (2006.01)
*G01N 30/72* (2006.01)
(Continued)

(52) U.S. Cl.
CPC ....... *G01N 30/468* (2013.01); *G01N 30/7206* (2013.01); *G01N 30/722* (2013.01);
(Continued)

(58) Field of Classification Search
CPC .......................... G01N 30/468; G01N 30/724
(Continued)

(56) References Cited

U.S. PATENT DOCUMENTS 3,230,048 A * 1/1966 Skeggs .................. G01N 35/08
73/61.56
3,490,202 A * 1/1970 Ayers ................... G01N 30/461
96/104
(Continued)

FOREIGN PATENT DOCUMENTS

CN    115267036 A * 11/2022 ............. G01N 30/36
CN    117153659 A * 12/2023
(Continued)

OTHER PUBLICATIONS

Cai et al., A straightforward means of coupling preparaive high-performance liquid chromatography and mass spectrometry, Rapid Communications in Mass Spectrometry, 2002; 16: 544-554 (Year: 2002).*

(Continued)

*Primary Examiner* — Stephanie E Bloss
*Assistant Examiner* — Kevin C Butler
(74) *Attorney, Agent, or Firm* — Woodard, Emhardt, Henry, Reeves & Wagner, LLP

(57) ABSTRACT

The present disclosure is related to an analytical system comprising a liquid chromatographic (LC) system comprising a plurality of fluidic streams alternately connectable to a common detector via a stream-selection valve connected to the detector via a valve-to-detector conduit. The analytical system further comprises a wash pump fluidically connected to the stream-selection valve and configured to connect to the valve-to-detector conduit between two consecutive fluidic streams in order to wash liquid from a previous fluidic stream out of the valve-to-detector conduit before liquid from a subsequent fluidic stream enters the valve-to-detector conduit. An analytical method comprising switching between the fluidic streams and washing in between is also disclosed.

12 Claims, 11 Drawing Sheets

(51) Int. Cl.
  *G01N 30/74* (2006.01)
  *G01N 30/84* (2006.01)
  *H01J 49/04* (2006.01)

(52) U.S. Cl.
  CPC ........... *G01N 30/724* (2013.01); *G01N 30/74* (2013.01); *G01N 30/84* (2013.01); *H01J 49/0422* (2013.01)

(58) Field of Classification Search
  USPC ........................................................ 73/23.37
  See application file for complete search history.

(56) References Cited

U.S. PATENT DOCUMENTS

| | | | |
|---|---|---|---|
| 5,449,902 A | 9/1995 | Onishi et al. | |
| 6,812,030 B2* | 11/2004 | Ozbal | B01L 3/5085 |
| | | | 422/63 |
| 2002/0160521 A1* | 10/2002 | Ozbal | G01N 35/00009 |
| | | | 436/161 |
| 2005/0123970 A1* | 6/2005 | Ozbal | H01J 49/04 |
| | | | 210/659 |
| 2018/0292368 A1* | 10/2018 | Franz | B01D 15/1885 |
| 2021/0003541 A1* | 1/2021 | Sievers-Engler | G01N 30/468 |
| 2022/0128531 A1* | 4/2022 | Tiemann | G01N 30/7233 |
| 2022/0349863 A1* | 11/2022 | Leinenbach | G01N 30/40 |
| 2023/0037141 A1* | 2/2023 | Quint | G01N 30/466 |
| 2023/0136050 A1* | 5/2023 | Ogawa | G01N 30/88 |
| | | | 73/61.53 |

FOREIGN PATENT DOCUMENTS

| | | | | |
|---|---|---|---|---|
| EP | 3748354 A1 * | 12/2020 | | F04B 49/065 |
| JP | 2004531738 | 10/2004 | | |
| JP | 2007512515 | 5/2007 | | |
| JP | 6694509 B2 * | 5/2020 | | B01D 15/1885 |
| WO | WO 00/45929 | 8/2000 | | |
| WO | WO-0045929 A1 * | 8/2000 | | G01N 30/20 |
| WO | WO 2021/209373 | 10/2021 | | |

OTHER PUBLICATIONS

International Written Opinion of related PCT/EP2021/059412 mailed Jun. 15, 2021.

* cited by examiner

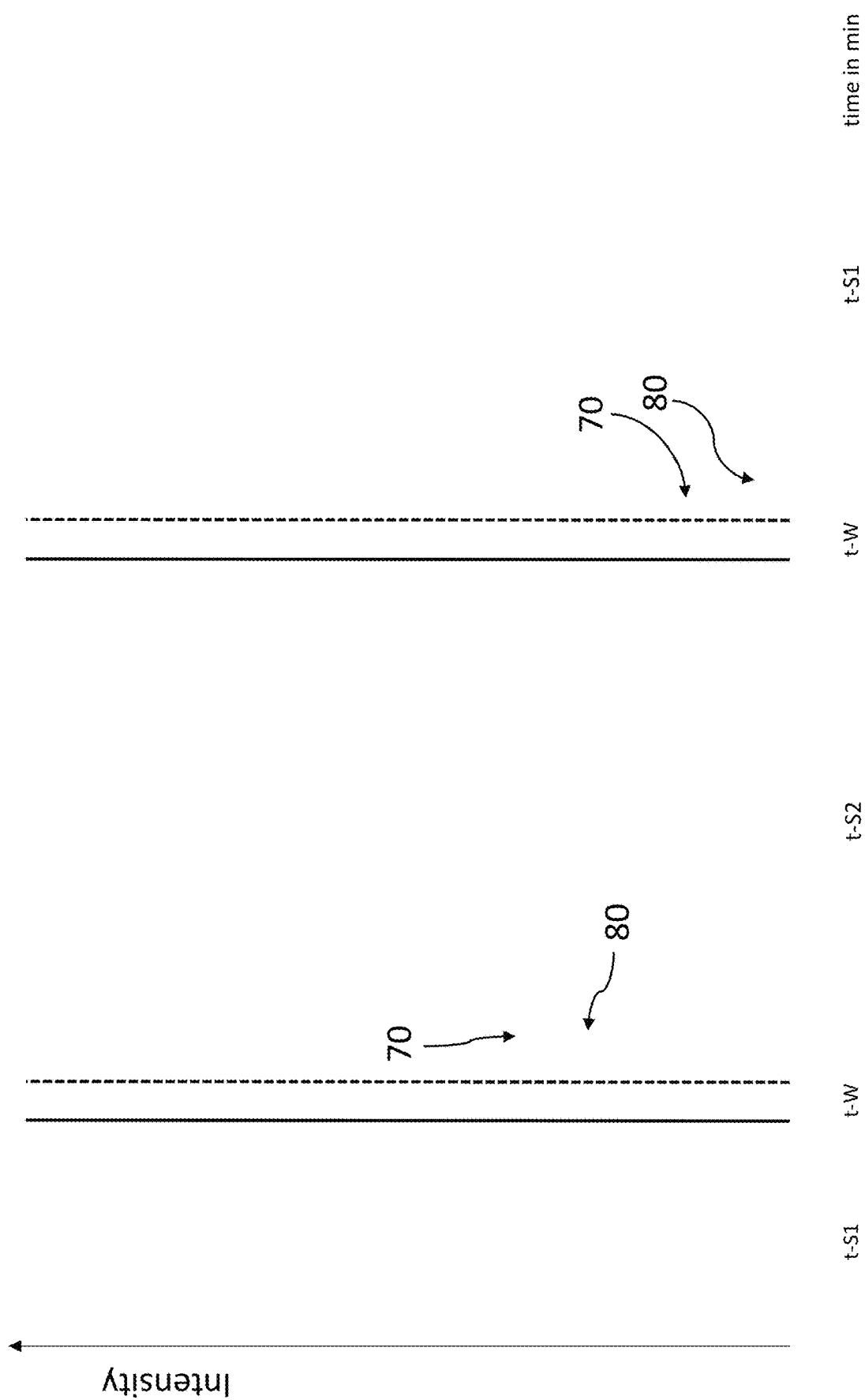

ANALYTICAL SYSTEM AND METHOD INCLUDING SWITCHING BETWEEN LIQUID CHROMATOGRAPHY FLUIDIC STREAMS

TECHNICAL FIELD

The present disclosure is related to an analytical system comprising a plurality of fluidic streams alternately connectable to a common detector and to an analytical method comprising switching between fluidic streams.

BACKGROUND

There is growing interest for the implementation of mass spectrometry and more specifically of liquid chromatography (LC) coupled to mass spectrometry in the clinical laboratory. However, the lack of standardized and automated procedures and the complexity of the analytical setup limit its implementation.

Also, typically, a batch approach is followed for processing samples with liquid chromatography-mass spectrometry, where a batch of samples prepared in advance under the same preparation conditions undergo consecutive chromatographic separation runs under the same separation conditions. This approach however does not enable high throughput and is not flexible, e.g., it does not allow for processing of samples in random order as they come. Batch processing also does not allow for re-scheduling (i.e., changing a pre-defined processing sequence) in view for example of incoming emergency samples that have higher priority and have to be processed first.

U.S. Patent Application Pub. No. 2018/0292368 A1 describes a system comprising a plurality of LC fluidic streams arranged in parallel and alternately connectable to a mass spectrometer, and a method enabling automated random-access sample preparation and LC separation, thereby making use of LC coupled to mass spectrometry suitable for clinical diagnostics.

For high-throughput applications requiring many consecutive sample injection cycles, and especially for random-access analysis of different samples possibly requiring different injection conditions and different LC separation conditions, even more flexibility and speed in quickly changing and adapting the conditions for each sample in a scheduled sequence, can be important.

In particular, it may be necessary to frequently exchange solvent/eluent used for the LC separations within the same fluidic stream and between parallel fluidic streams. Due to the nature of pump action, to internal dead volumes, and fluidic and surface effects, liquid exchange is a process of repeated dilution of the previously used liquid by the newly used liquid, possibly resulting in long equilibration and signal stabilization times. This process therefore may present a bottleneck if the goal is to achieve high-throughput random-access sample processing, in particular if the goal is to maintain a regular pace of sample injection and analysis regardless of the sample sequence and separation/analysis conditions.

General Description

It is against the above background that the embodiments of the present disclosure provide certain unobvious advantages and advancements over the prior art. In particular, the inventors have recognized a need for improvements in analytical systems and methods for switching between liquid chromatography fluidic streams.

Although the embodiments of the present disclosure are not limited to specific advantages or functionality, it is noted that the present disclosure provides an analytical system and method, which enable faster and more efficient exchange of the liquid from a previous LC fluidic stream with the liquid of a subsequent LC fluidic stream in the fluidic conduit leading from a stream-selection valve to a detector, thereby resulting in a shorter clearance (signal stabilization) time and hence increased throughput in random-access sample analysis.

Another advantage of the system and method herein disclosed is minimization of carryover, thus reducing baseline shifts and increasing sensitivity.

Another advantage of the system and method herein disclosed is that a condition of no flow can be prevented in case of system standby or interrupted liquid chromatography, thereby minimizing surface adsorption effects and contributing to maintain the valve-to-detector conduit cleaner, thus also minimizing maintenance costs and system downtimes.

Another advantage of the system and method herein disclosed is the enablement of automatic cleaning procedures at convenient times and independently of the liquid chromatography system, hence extending also the lifetime of some system components.

Another advantage of the system and method herein disclosed may be a standardization of the initial conditions at each fluidic stream switch by, e.g., introducing always the same liquid in between.

Another advantage of the system and method herein disclosed is the possibility to determine whether an eventual clogging is located in the fluidic conduit leading to the detector or elsewhere In particular, the analytical system in accordance with one embodiment of the present disclosure comprises a liquid chromatographic system comprising a plurality of fluidic streams alternately connectable to a common detector via a stream-selection valve connected to the detector via a valve-to-detector conduit. The analytical system further comprises a wash pump fluidically connected to the stream-selection valve and configured to connect to the valve-to-detector conduit between two consecutive fluidic streams in order to wash liquid from a previous fluidic stream out of the valve-to-detector conduit before liquid from a subsequent fluidic stream enters the valve-to-detector conduit.

"Liquid chromatography or LC" is an analytical process that subjects samples injected by a sample injector to chromatographic separation through an LC column in order for example to separate analytes of interest from matrix components, e.g., remaining matrix components after sample preparation that may still interfere with a subsequent detection, e.g., a mass spectrometry detection, and/or in order to separate analytes of interest from each other in order to enable their individual detection. "High-performance liquid chromatography" or HPLC, "ultra-high-performance liquid chromatography" or UHPLC, "micro liquid chromatography" or µLC and "small-bore liquid chromatography" or small-bore LC are forms of liquid chromatography performed under pressure.

A "liquid chromatographic system or LC system" is an analytical apparatus or module or a unit in an analytical apparatus for carrying out liquid chromatography. The LC system may be embodied as a single channel or as a multi-channel system that may comprise one or a plurality of LC columns arranged in parallel and/or in series. The LC system may also comprise elements such as a sample injector, valves, liquid sources, fluidic connections and parts, e.g., for mixing liquids, degassing liquids, tempering liquids, and the like, one or more sensors, such as pressure sensors, temperature sensors and the like, and especially at least one LC pump. The list is not exhaustive.

According to an embodiment, the detector can be a mass spectrometer connected to the valve-to-detector conduit via an ionization source. The detector may however be something other than a mass spectrometer, such as, i.e., an optical detector, e.g., a UV or fluorescence detector, an impedance detector, a conductivity detector and the like.

According to an embodiment, the LC system can be configured as an analytical module designed to prepare a sample for mass spectrometry and/or to transfer a prepared sample to a mass spectrometer, in particular for separating analytes of interest before detection by a mass spectrometer. In particular, typically, during an LC run, the mass spectrometer may be set to scan a specific mass range. LC/MS data can be represented by adding up the ion current in the individual mass scans and plotting that "totaled" ion current as an intensity point against time. The resulting plot looks like an HPLC UV trace with analyte peaks.

A "fluidic stream" is a fluidic path through which liquids can flow and in particular through which a sample from a sample injection point can be transferred to a detector, e.g., to a mass spectrometer or other detector, and through which the sample may undergo a chromatographic process. The fluidic connection through different parts of the fluidic stream may be discontinuous. This is because the fluidic stream may comprise elements such as switching valves that may establish alternative connections and regulate fluidic flow between different parts of the fluidic stream at different times. The fluidic stream may comprise at least one capillary tubing and/or LC column comprising a stationary phase selected according to the type of sample(s) and analytes of interest, and through which a mobile phase is pumped in order to trap and/or separate and elute and/or transfer analytes of interest under selected conditions, e.g., according to their polarity or log P value, size or affinity, as generally known. The at least one LC column may be exchangeable. In particular, the LC system may comprise more LC columns than fluidic streams, where a plurality of LC columns may be selectable, e.g., interchangeably coupled to the same fluidic stream. Capillary tubing may be also used to bypass LC columns. A fluidic stream may comprise a plurality of substreams.

In particular, the LC system in accordance with one or more embodiments of the disclosure may comprise a plurality of fluidic streams connected to a stream-selection valve for directing flow from one fluidic stream at a time to a detector.

An "LC column" may refer to any of a column, a cartridge, a capillary and the like for performing separations of a chromatographic nature. Columns are typically packed or loaded with a stationary phase, through which a mobile phase is pumped in order to trap and/or separate and elute and/or transfer analytes of interest under selected conditions, e.g., according to their polarity or log P value, size or affinity, as generally known. This stationary phase can be particulate or beadlike or a porous monolith. However, the term "column" may also refer to capillaries or channels that are not packed or loaded with a stationary phase, but rely on the surface area of the inner capillary wall or geometrical structures to effect separations. An example is provided by pillar array chromatography, where separation beds are formed by etching away interstitial volumes out of a solid silicon wafer, leaving an array of pillars. The resulting channels can be folded onto a small footprint by concatenating bed segments with optimized flow distributors that limit peak dispersion. This creates a stationary phase support structure that is organized in a reproducible, ordered pattern.

The LC column may be exchangeable and/or operate in parallel or in sequence to one or more other LC columns. An LC column may be for example a rapid trap and elute LC column or "trap-column" for short, a HPLC column or a UHPLC column, and may be of any size, including micro-LC columns and small-bore LC columns, or pillar array LC columns, with an inner diameter of 1 mm or less. In the case of trap-columns, a stationary phase can be selected, which retains analytes of interest, whereas any salts, buffer, detergents and other matrix components are unretained and washed away. This process is typically followed by elution of the analytes, e.g., in back flush mode, with a different mobile phase or a solvent gradient. Depending on the analytes, separation of some analytes can be expected in some cases. On the other hand, in case of analytes having identical masses (isobaric) and/or overlapping daughter ion spectra in multiple reaction monitoring (MRM), when it comes to mass spectrometry, a more extensive chromatographic separation could be typical. In that case, separation in a HPLC or UHPLC column may be advantageous.

A "liquid chromatography pump or LC pump" is a high-pressure pump that may vary in pressure capacity but that can yield a consistent and reproducible volumetric flow rate though an LC channel. Pressure in HPLC may typically reach as high as 60 MPa or about 600 atmospheres, whereas UHPLC and µ-LC systems have been developed to work at even higher pressures, e.g., up to 140 MPa or about 1400 atmospheres, and therefore are able to use much smaller particle sizes in the LC columns (<2 µm). LC pumps may be configured as binary pumps or even quaternary pumps, e.g., in case of conditions requiring the use of elution gradients by gradually varying the ratio between up to four elution solvents.

According to one embodiment, the LC pump can yield a pressure of 60 MPa to 140 MPa, typically 75 MPa to 100 MPa, and more typically 80 MPa.

According to one embodiment, the LC pump can be configured to operate with a flow rate between 1 µl/min and 500 µl/min or more, typically up to 1500 µl/min, and more typically operate at flow rates between 100 µl/min to 300 µl/min, and an accuracy of, e.g., about ±5% or less.

The LC pump may comprise more than one pump head. For example, binary pumps comprise two pump heads and each pump head typically comprises a primary pump head and a secondary pump head cooperating with each other for pumping liquid while maintaining the liquid pressure inside the pump head about constant. In particular, each of the primary pump head and of the secondary pump head is typically a syringe-like pump comprising a syringe-like cylinder body having an inner wall surface and a plunger translatable through the cylinder body leaving an interspace between the inner wall surface and the plunger when the plunger is translated through the cylinder body.

The term "liquid" in relation to a fluidic stream refers to liquids commonly used in liquid chromatography, e.g., as solvents or mixtures of solvents used, e.g., as mobile phases or eluents (elution solvents), and as known in the art.

A "wash pump" is an auxiliary pump distinguished at least in function from the LC pump, the main or sole function being to facilitate and to speed up liquid exchange within the valve-to-detector conduit. In general, the wash pump is a lower-pressure and higher-volume (higher-flowrate) pump compared to the LC pump, and is fluidically connected to the stream-selection valve, independent of the LC system. Typically, the wash pump according to the present disclosure is also a lower-precision pump and hence is also simpler in construction and less expensive in comparison to an LC pump. According to an embodiment of the present disclosure the wash pump is a positive-pressure pump. Any pump suitable to generate a positive-pressure in order to actively pump a wash liquid from a wash liquid source through the valve-to-detector conduit via the stream-selection valve, may be used, like for example membrane/diaphragm pumps, single-plunger high-speed pumps, syringe-piston pumps, gear pumps and the like. According to an embodiment, positive pressure and active pumping may be achieved by applying pneumatic pressure, e.g., by pressurized gas, e.g., by a nitrogen supply, into a sealed liquid container connected to the upstream inlet valve.

According to an embodiment, the wash pump is configured to pump a wash liquid through the valve-to-detector conduit at a flow rate higher than that of the fluidic streams, e.g., several times higher, for example, 5 times, 10 times, 20 times or higher. For example, in case of μ-LC with typical flow rates around 1 μL/min, a wash pump flow rate of 5 μL/min may be already beneficial. In case of flow rates of the fluidic streams around 100 μL/min, effective flow rates for the wash pump are around 500-1000 μL/min or higher. According to some embodiments, flow rates for the wash pump up to 5000 μL/min are possible.

A "wash liquid" is a liquid suitable to wash out, hence to dissolve, eventual traces of samples in the valve-to-detector conduit while still being compatible with the detector used, e.g., with a mass spectrometer. Therefore, a wash liquid may be the same as or similar to an elution solvent used for chromatography, which depending on the type of samples and analytes may be different. For example, for analytes for which typically reversed-phase chromatography is used, suitable solvents may be organic solvents like methanol, acetonitrile, tetrahydrofuran, and/or isopropylic alcohol. These solvents may be also mixed with each other and/or with water. Acidic or basic additives may be added to adjust the pH. Typical additives can include formic acid, ammonium formate, ammonium acetate, etc. For example, for analytes for which typically normal-phase chromatography is used, suitable solvents may include solvents like hexane, heptane mixed with polar organic solvents such as ethyl acetate, chloroform or 2-propanol.

The term "valve" refers to a flow-regulating device to control, redirect, restrict or stop flow and, in particular, to an LC switching valve, that is a multi-port valve that controls flow between elements connected to the ports. This is typically achieved by moving one or more valve conduits to switch communication between different elements. Elements may be fluidically connected to the ports via further conduits, like pipes, tubes, capillaries, microfluidic channels and the like, and by fittings like screws/nuts and ferrules, or alternative liquid-tight seals, e.g., maintained in place by a clamp mechanism. An LC switching valve is normally capable of allowing liquid pressures in the order of magnitude used for HPLC or higher.

In particular, the stream-selection valve may comprise a port for each fluidic stream from the LC system, a port for the valve-to-detector conduit, and a plurality of waste ports.

According to an embodiment of the present disclosure, the stream-selection valve has an inner valve conduit(s) with an inner diameter of less than 0.6 mm, typically between about 0.5 mm and 0.2 mm, more typically about 0.4 mm, and even more typically about 0.25 mm. The inner valve conduit can have however any other diameter in typically used ranges.

According to an embodiment of the present disclosure, the stream-selection valve has a typical switching time of about 500 ms or less. The switching time can be however also longer than 500 ms.

A "mass spectrometer (MS)" is an analytical module comprising a mass analyzer designed to further separate and/or detect analytes based on their mass to charge ratio. According to an embodiment, the mass spectrometer is a fast scanning mass spectrometer. According to an embodiment, the mass spectrometer is a tandem mass spectrometer capable of selecting parent molecular ions, generating fragments by collision-induced fragmentation, and separating the fragments or daughter ions according to their mass to charge (m/z) ratio. According to an embodiment, the mass spectrometer is a triple quadrupole mass spectrometer, as known in the art. Besides quadrupoles, other types of mass analyzers may be used as well, including time of flight, ion trap or combinations thereof.

An "ionization source (IS)" is an interface coupling LC to MS, configured to generate charged analyte molecules (molecular ions) and transferring the charged analyte molecules from a liquid into a gas phase. According to certain embodiments, the ionization source is an electro-spray-ionization (ESI) source, or a heated-electrospray-ionization (HESI) source, or an atmospheric-pressure-chemical-ionization (APCI) source, or an atmospheric-pressure-photo-ionization (APPI) or an atmospheric-pressure-laser-ionization (APLI) source. The LC/MS interface may comprise however a double ionization source, e.g., both an ESI and an APCI source, or a modular exchangeable ionization source.

Typical parts of an ionization source are a nebulizer and a sampling capillary, typically arranged orthogonally or coaxially with respect to each other. An LC eluate exiting an LC stream is guided through a probe including a sprayer needle or capillary. In this manner, the LC eluate is nebulized in a volume downstream of the sprayer capillary where ionization takes place and the charged analyte molecules thereby obtained are brought into a gaseous phase. A sampling device (e.g., a sampling capillary or orifice) is provided to collect the ions in the gaseous phase and guide them into the mass spectrometer.

The ionization source may further include an assembly to provide a curtain gas, also known as counter gas, (e.g., $N_2$), which reduces the entry of background ions (e.g., solvent clusters) into the MS. The assembly can have a curtain plate and an orifice assembly for providing the curtain gas. The ionization source may further include an assembly to provide an auxiliary gas, also known as heater gas.

In order to optimize ionization conditions, it is also possible to adjust solvent composition by adding a make-up flow directly before the ionization source to adjust pH, salts, buffers or organic content.

Such ionization sources are known in the art and not further elucidated here.

According to an embodiment, the ionization source comprises a sprayer capillary that forms part of the valve-to detector conduit. Thus, liquid from the fluidic streams, including LC eluates, and wash liquid in between fluidic streams alternately flow through the sprayer capillary fluidically connected to the stream-selection valve.

The analytical system may comprise a controller configured to manage a fluidic-stream connection time, that is the connection time between each fluidic stream and the valve-to-detector conduit, and a wash-pump connection time, that is the connection time between the wash pump and the valve-to-detector conduit, by controlling switching of the stream-selection valve. Also, the controller may be configured to control the wash pump such that wash liquid is pumped only during the wash-pump connection time.

As used herein, the term "controller" can mean a processing unit, such as a microprocessor, a microcontroller, a reduced instruction circuit (RISC), an application specific integrated circuit (ASIC), a logic circuit, and any other circuit or processor capable of executing the functions/methods described herein.

The controller may be integrated into the analytical system or be a separate logic entity in communication with the analytical system via a direct connection, wired or wirelessly, or indirectly over a communications network, wired or wirelessly, such as a wide area network, e.g., the Internet or a Health Care Provider's local area network or intranet, via a network interface device. In some embodiments, the processor might be integral with a data management unit, e.g., implemented on a computing device such as a desktop computer, a laptop, a smartphone, a tablet, PDA, etc. It may include a server computer and/or be distributed/shared across/between a plurality of analytical systems. Moreover, the analytical system can include remote devices, servers and cloud-based elements that communicate via wires or wirelessly (e.g., infrared, cellular, Bluetooth®) with the controller, or a remote PC/server or a cloud-based system. The controller may be also configurable to control the analytical system in a way that workflow(s) and workflow step(s) are conducted by the analytical system. In particular, the processor may communicate and/or cooperate with a scheduler and/or a data manager in order to take into account incoming test orders and/or received test orders, and a number of scheduled process operations associated with the execution of the test orders, in combination with managing the fluidic-stream connection time and the wash-pump connection time, controlling switching of the stream-selection valve and action of the wash pump.

According to an embodiment, the fluidic-stream connection time is fixed and is the same for each fluidic stream. In addition, the wash-pump connection time is fixed and is a fraction of the fluidic-stream connection time, thereby resulting at least temporarily in a continuous switching at a regular pace. It may in particular be beneficial if the wash-pump connection time is 20% or less, typically 10% or less, or more typically 5% or less of the fluidic-stream connection time and that the conditions of the wash pump in terms of, e.g., flow rate and/or washing liquid, are so adapted that the wash-pump connection time is minimized. In absolute terms the wash-pump connection time may be as short as a few seconds, typically 5 s or less, more typically 3 s or less.

According to an embodiment, the controller can be configured to adjust a set of parameters of the detector and/or ionization source from a previous configuration related to the previous fluidic stream to a subsequent configuration related to the subsequent fluidic stream during the wash-pump connection time before switching to the subsequent fluidic stream. In this way, by the time the stream-selection valve is switched again, the detector is ready for the subsequent fluidic stream and the fluidic-stream connection time may be in turn also reduced, thereby further increasing throughput. According to an embodiment, the set of parameters can comprise any one or more of a curtain gas pressure, a nebulizer gas pressure, an auxiliary gas pressure, sprayer capillary voltage, sampling capillary voltage and the like, including anything that can be adjusted in advance of starting the detection of an eluate from a fluidic stream.

According to an embodiment, the controller can be configured to extend the wash-pump connection time while pumping of wash liquid through the valve-to-detector conduit in case of interrupted switching between fluidic streams or in case of system standby. In case of interrupted switching between fluidic streams or in case of system standby it is otherwise possible that liquid from the last fluidic stream evaporates and the fluidic conduit or part of it, in particular the sprayer capillary, may dry out leading to eventual sample traces or mobile phase additive, e.g., salt, concentration, deposition or even crystallization possibly resulting in clogging and/or strong contamination requiring special maintenance procedure, such as, e.g., replacement of the capillary spray. Considering that an ion source is typically heated, evaporation may happen relatively quickly. The continued use of the wash pump can thus be advantageous in preventing this evaporation by maintaining a continuous liquid flow.

According to an embodiment, the analytical system comprises a pressure gauge between the wash pump and the stream-selection valve for determining the liquid pressure and the controller is configured to compare the liquid pressure determined during the wash-pump connection time with the liquid pressure determined when the wash pump is fluidically connected to waste and based on such comparison to determine whether there is a clogging in the valve-to-detector conduit.

In accordance with another embodiment of the instant disclosure, an automated analytical method is herein also described, the method comprising alternately connecting a plurality of fluidic streams of a liquid chromatographic (LC) system to a common detector via a stream-selection valve connected to the detector via a valve-to-detector conduit, the method further comprising fluidically connecting a wash pump to the valve-to-detector conduit via the stream-selection valve between two consecutive fluidic streams and washing liquid from a previous fluidic stream out of the valve-to-detector conduit before liquid from a subsequent fluidic stream enters the valve-to-detector conduit.

According to an embodiment, the method can further comprise automatically managing a fluidic-stream connection time, that is the connection time between each fluidic stream and the valve-to-detector conduit, and a wash-pump connection time, that is the connection time between the wash pump and the valve-to-detector conduit, by controlling switching of the stream-selection valve.

According to another embodiment, the fluidic-stream connection time can be fixed and is the same for each fluidic stream, and wherein the wash-pump connection time is fixed and is a fraction of the fluidic-stream connection time, thereby resulting at least temporarily in a continuous switching at a regular pace.

According to yet another embodiment, the method comprises adjusting a set of parameters of the detector and/or of an ionization source in case the detector is a mass spectrometer from a previous configuration related to the previous fluidic stream to a subsequent configuration related to the subsequent fluidic stream during the wash-pump connection time before switching to the subsequent fluidic stream.

According to still yet another embodiment, the method further comprises extending the wash-pump connection time while pumping of wash liquid through the valve-to-detector conduit in case of interrupted switching between fluidic streams or in case of system standby.

According to an embodiment, the method comprises comparing the liquid pressure between the wash pump and the stream-selection valve determined during the wash-pump connection time with the liquid pressure determined when the wash pump is fluidically connected to waste and based on such comparison determining whether there is a clogging in the valve-to-detector conduit.

Other and further objects, features and advantages will appear from the following description of exemplary embodiments in combination with the drawings and the accompanying claims. It is noted that the scope of the claims is defined by the recitations therein and not by the specific discussion of features and advantages set forth in the present description.

BRIEF DESCRIPTION OF THE DRAWINGS

The following detailed description of the embodiments of the present disclosure can be best understood when read in conjunction with the following drawings, where like structure is indicated with like reference numerals and in which:

FIG. 5 is an experimental example showing an effect that can be achieved.

Figure 1A:
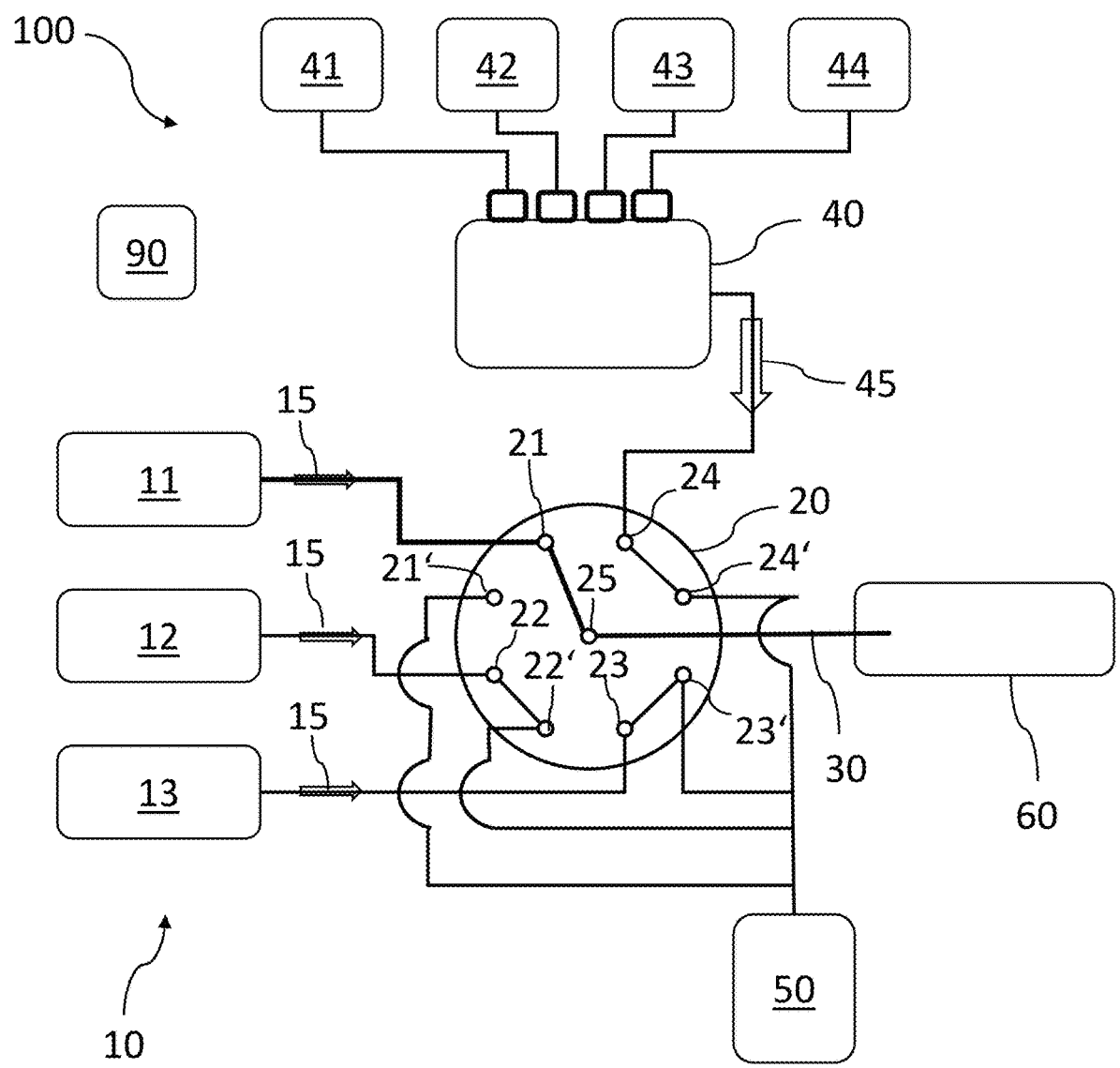
FIG. 1A shows schematically an analytical system comprising a wash pump connected to a stream-selection valve and a first step of an analytical method comprising using the wash pump.

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiments of the present disclosure.

DETAILED DESCRIPTION

FIGS. 1A-1F show a schematic example of analytical system 100 comprising a liquid chromatographic (LC) system 10 comprising a plurality of fluidic streams 11, 12, 13 alternately connectable to a common detector 60 via a stream-selection valve 20 connected to the detector 60 via a valve-to-detector conduit 30. The analytical system 100 further comprises a wash pump 40 fluidically connected to the stream-selection valve 20 and configured to connect to the valve-to-detector conduit 30 between two consecutive fluidic streams 11,12; 12,13; 13,11 in order to wash liquid from a previous fluidic stream out of the valve-to-detector conduit 30 before liquid from a subsequent fluidic stream enters the valve-to-detector conduit 30.

In particular, the stream-selection valve 20 comprises in this case a fluidic-stream port 21, 22, 23 for each fluidic stream 11, 12, 13, respectively, a waste port 21', 22', 23' for each fluidic stream 11, 12, 13, respectively, leading to a waste 50, a wash-pump-inlet port 24 and a wash-pump-waste port 24' leading to the waste 50. The stream-selection valve 20 comprises in addition a valve-to-detector conduit port 25, connected to the valve-to-detector conduit 30. It is clear that this is only an example and the number of ports and connection may be adapted according to the need and in particular according to the number of fluidic streams.

The wash pump 40 is connected in this example to four wash liquid containers containing respective wash liquid 41, 42, 43, 44 such as, for example, water, acetonitrile, methanol, tetrahydrofuran or isopropylic alcohol, which may be pumped individually or mixed with each other in any combination and ratio, depending, e.g., on the LC conditions, on the type of samples and/or analytes flowing in between and on the desired washing effect. In particular, the washing pump 40 is configured to pump a wash liquid through the valve-to-detector conduit 30 at a flow rate 45 higher than a flow rate 15 of the fluidic streams 11, 12, 13.

The analytical system 100 further comprises a controller 90 configured to manage a fluidic-stream connection time, that is the connection time between each fluidic stream 11, 12, 13 and the valve-to-detector conduit 30, and a wash-pump connection time, that is the connection time between the wash pump 40 and the valve-to-detector conduit 30, by controlling switching of the stream-selection valve 20.

With continued reference to FIGS. 1A-1F, an automated analytical method is also schematically shown, the method comprising alternately connecting a plurality of fluidic streams 11, 12, 13 of a liquid chromatographic (LC) system 10 to a common detector 60 via a stream-selection valve 20 connected to the detector 60 via a valve-to-detector conduit 30, the method further comprising fluidically connecting a wash pump 40 to the valve-to-detector conduit 30 via the stream-selection valve 20 between two consecutive fluidic streams 11,12; 12,13; 13,11 and washing liquid from a previous fluidic stream out of the valve-to-detector conduit 30 before liquid from a subsequent fluidic stream enters the valve-to-detector conduit 30.

In particular, FIG. 1A shows a first step of the method in which the stream-selection valve 20 is switched such as the fluidic stream 11 is connected to the valve-to-detector conduit 30, whereas the other fluidic streams 12, 13 are connected to waste ports 22', 23', respectively. The wash pump 40 is also connected to the respective wash-pump-waste port 24'.

Figure 1B:
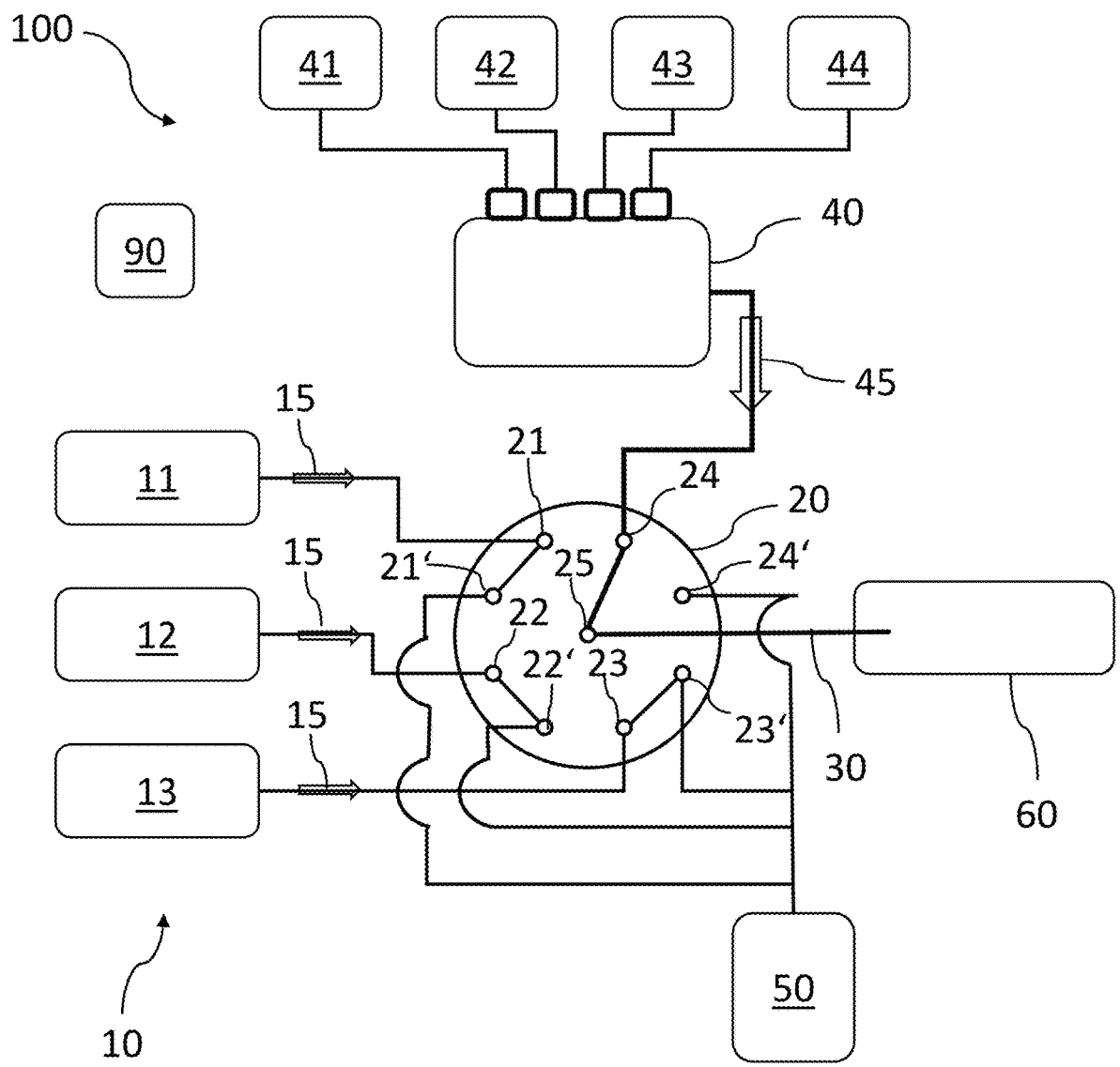
FIG. 1B shows schematically the same analytical system of FIG. 1A and a second step of the same method.

FIG. 1B shows a second step of the method in which the stream-selection valve 20 is switched such as the wash pump 40 is connected to the valve-to-detector conduit 30, whereas all fluidic streams 11, 12, 13 are directed to waste 50 via waste ports 21', 22', 23', respectively.

Figure 1C:
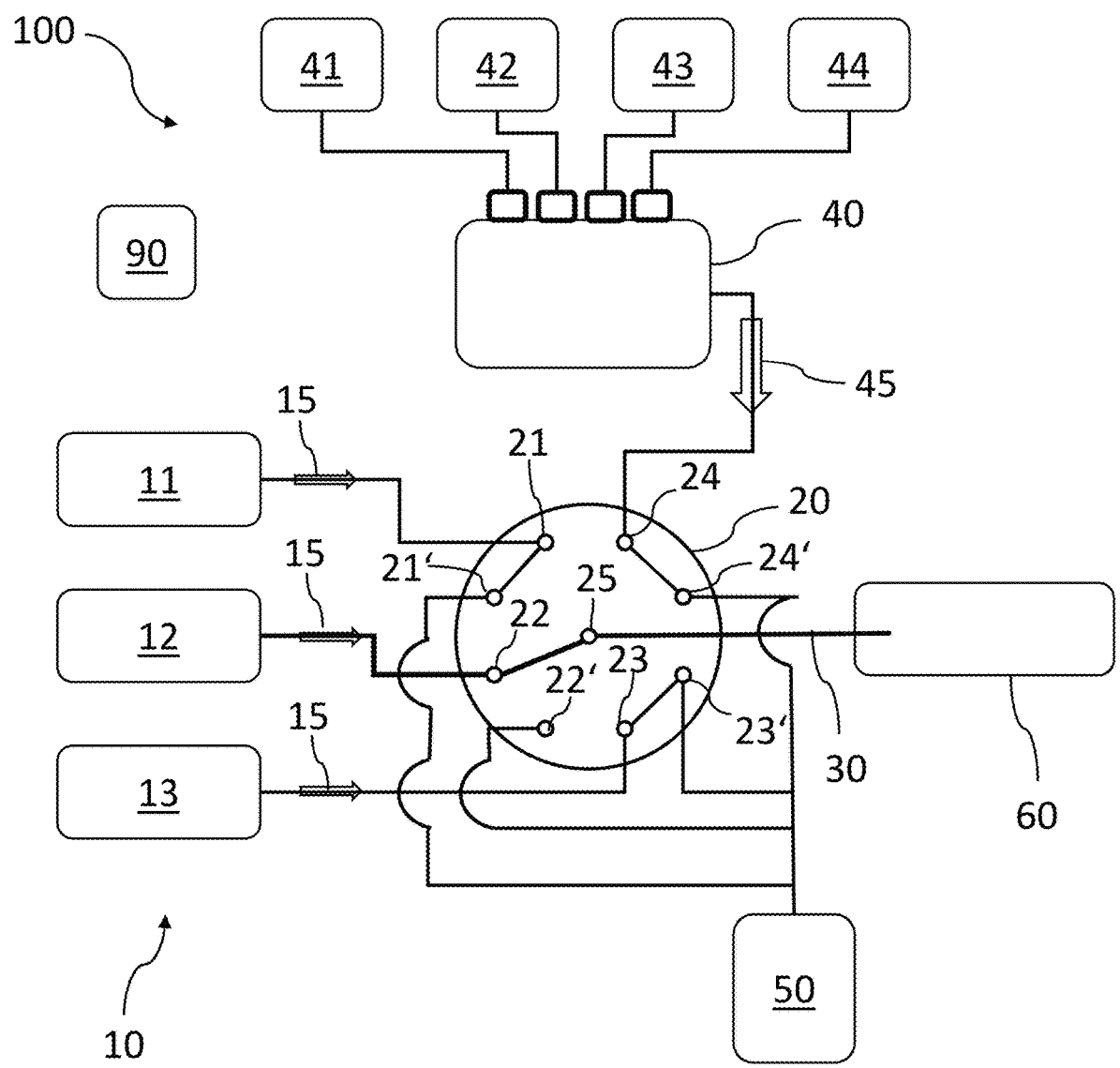
FIG. 1C shows schematically the same analytical system of FIG. 1A and a third step of the same method.

FIG. 1C shows a third step of the method in which the stream-selection valve 20 is switched such as the fluidic stream 12 is connected to the valve-to-detector conduit 30, whereas the other fluidic streams 11, 13 are connected to waste ports 21', 23', respectively. The wash pump 40 is also connected to the respective wash-pump-waste port 24'.

Figure 1D:
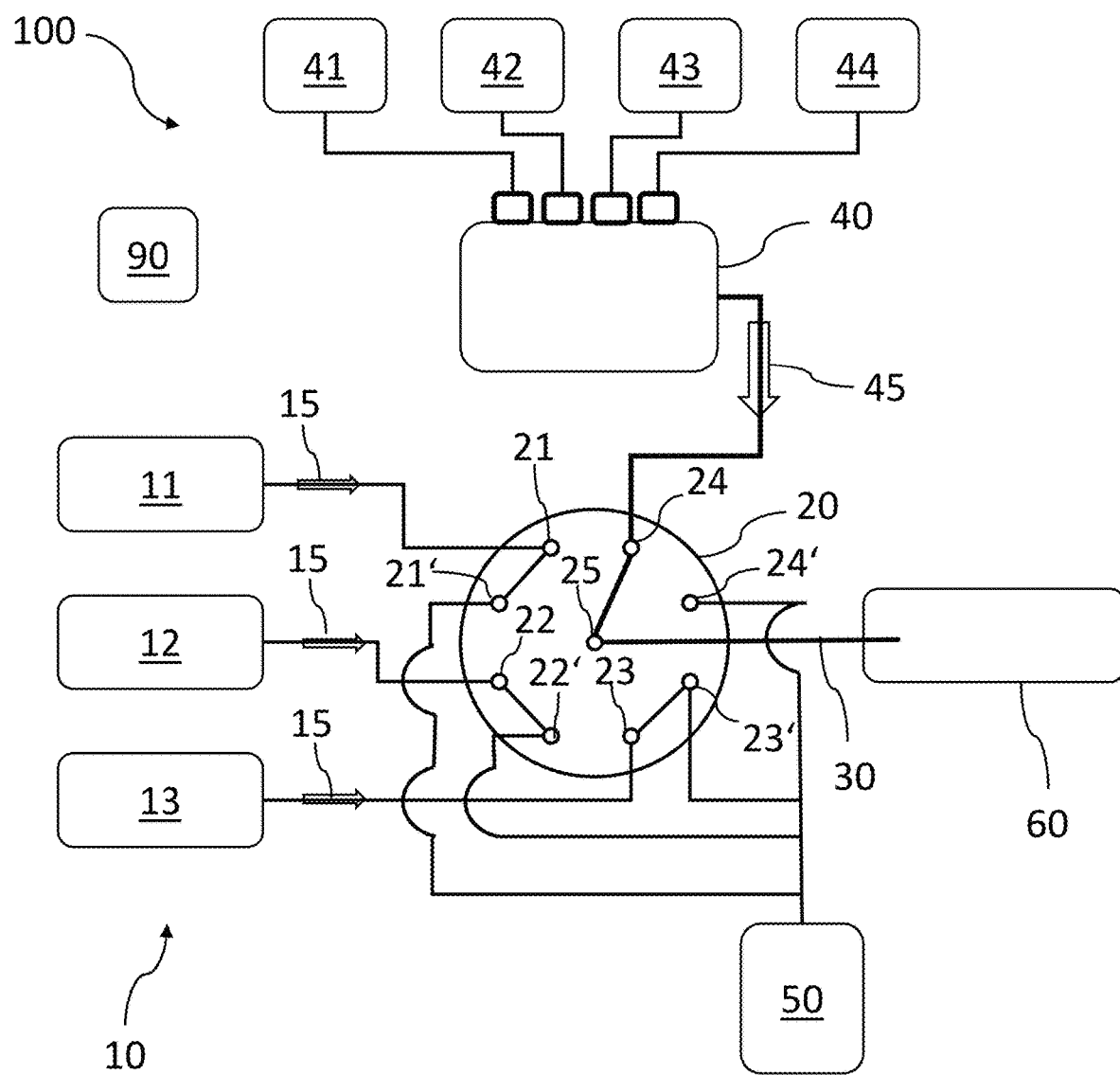
FIG. 1D shows schematically the same analytical system of FIG. 1A and a fourth step of the same method, which is identical to that of FIG. 1B.

The fourth step of the method as shown in FIG. 1D is identical to the second step of FIG. 1B.

Figure 1E:
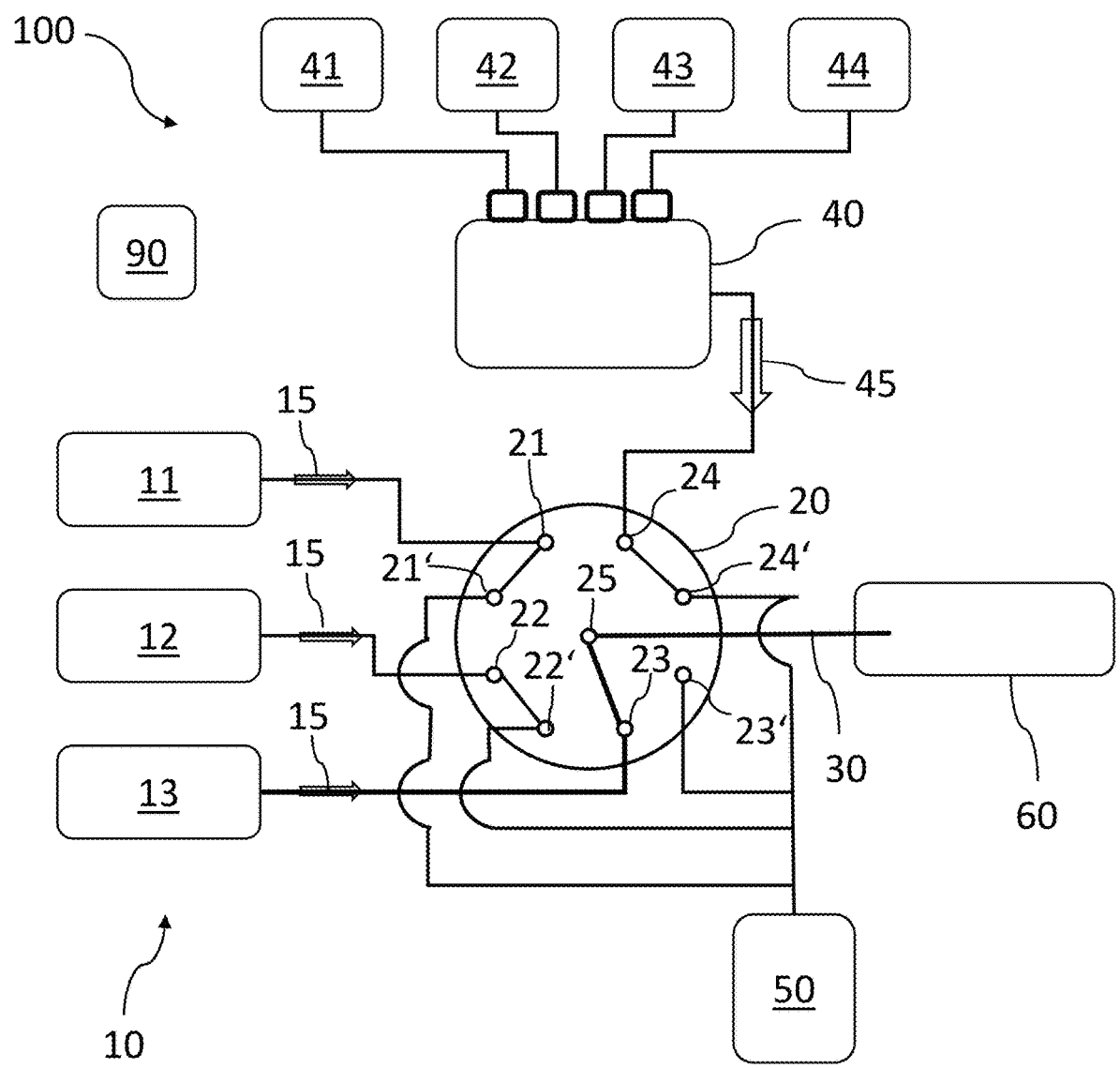
FIG. 1E shows schematically the same analytical system of FIG. 1A and a fifth step of the same method.

FIG. 1E shows a fifth step of the method in which the stream-selection valve 20 is switched such as the fluidic stream 13 is connected to the valve-to-detector conduit 30, whereas the other fluidic streams 11, 12 are connected to waste ports 21', 22', respectively. The wash pump 40 is also connected to the respective wash-pump-waste port 24'.

Figure 1F:
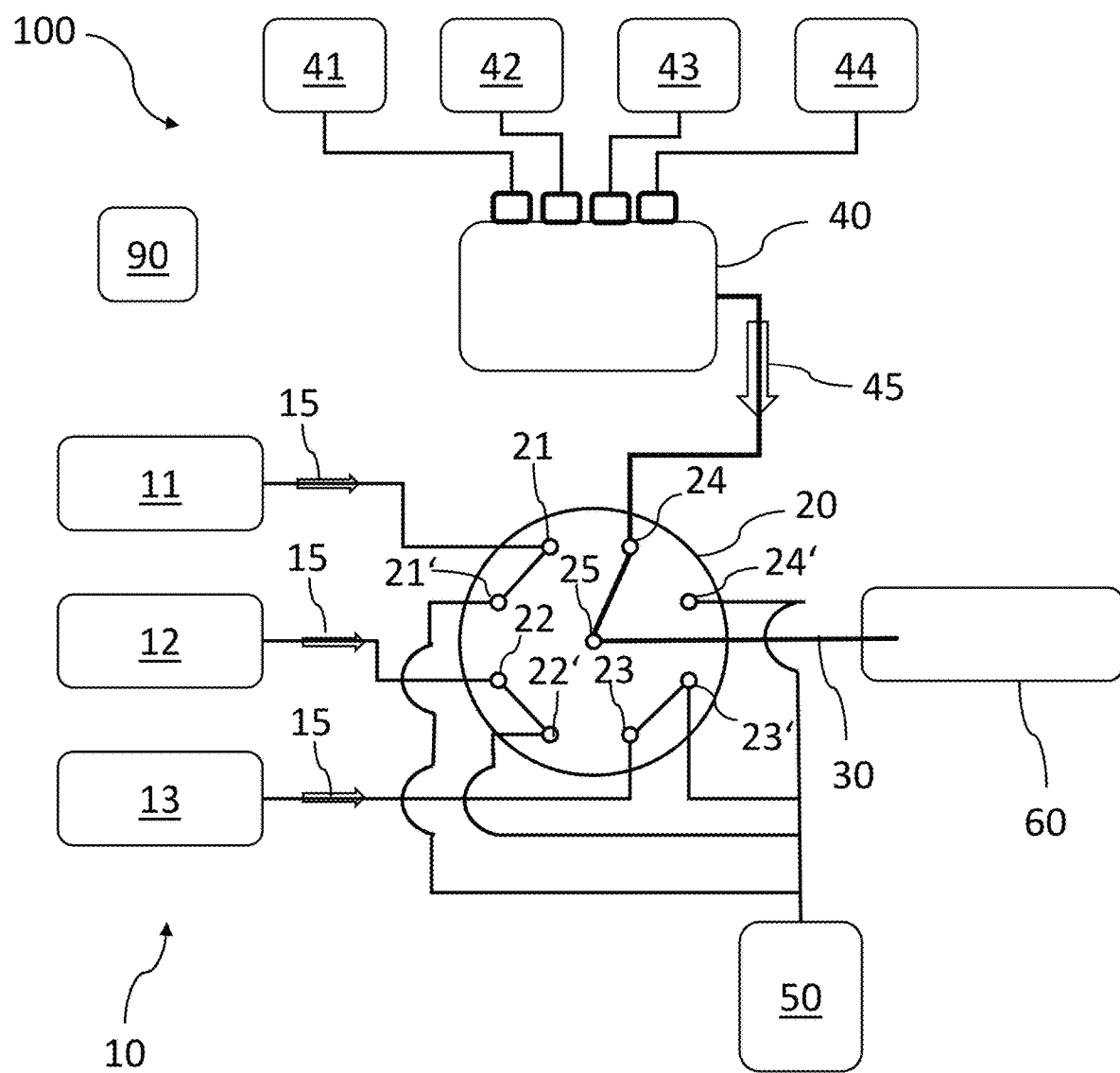
FIG. 1F shows schematically the same analytical system of FIG. 1A and a sixth step of the same method, which is identical to that of FIG. 1B and FIG. 1D.

The sixth step of the method shown in FIG. 1F is identical to the second step of FIG. 1B and fourth step of FIG. 1B, before starting over again with the first step of FIG. 1A.

With continued reference to FIGS. 1A-1F, the controller 90 may be configured to control the wash pump 40 such that wash liquid is pumped only during the wash-pump connection time, that is only during the second, fourth and sixth steps of FIGS. 1B, 1D, 1F, thereby preventing waste of large volumes of wash liquid, due to the higher flow rate. The controller 90 may be further configured to control the selection and or proportion of individual wash liquids 41, 42, 43, 44.

Of course, variations of the method are possible, where a different number of fluidic streams is present and/or where the sequence between fluidic streams may be different. In particular, the method may be adapted to switch between any two or more or all of a plurality of fluidic streams and in any sequence according to the analytical method, as long as the method comprises switching to the wash pump in between two consecutive fluidic streams.

Figure 2:
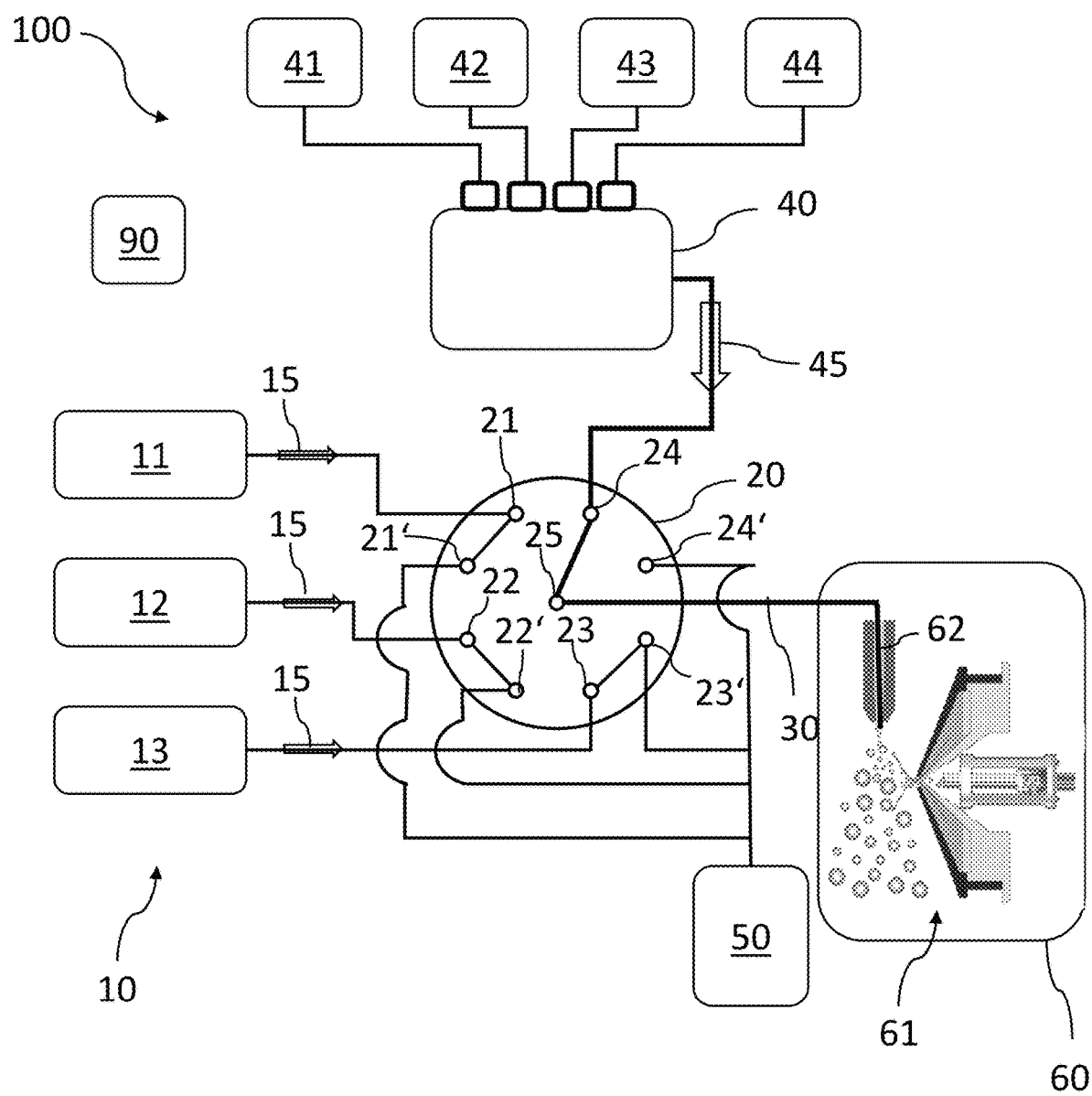
FIG. 2 shows schematically further details of the analytical system of FIGS. 1A-1F related to the detector.

FIG. 2 shows schematically an embodiment of the analytical system of FIGS. 1A-1F, where the detector 60 is a mass spectrometer connected to the valve-to-detector conduit 30 via an ionization source 61, such as an electrospray ionization (ESI) source, comprising a sprayer capillary 62 that forms part of the valve-to detector conduit 30, being washed with the wash liquid from the wash pump 40.

Figure 3:
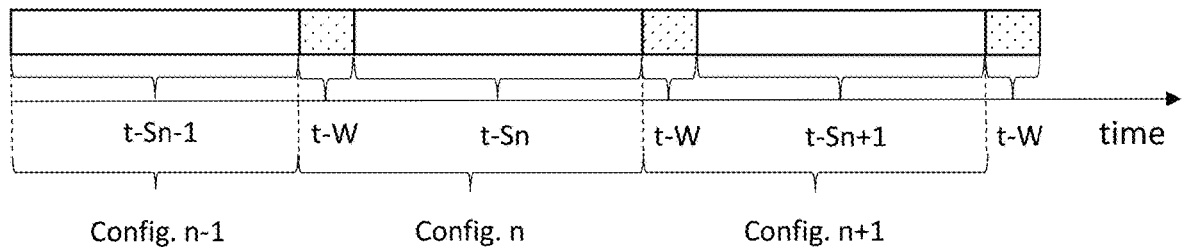
FIG. 3 shows schematically a method of controlling switching of the stream-selection valve.

FIG. 3, in connection to FIGS. 1A-1F, shows further aspects of the method of FIGS. 1A-1F, according to some embodiments. According to one aspect, the method comprise automatically managing by the controller 90 a fluidic-stream connection time, t-Sn−1, t-Sn, t-Sn+1, that is the connection time between each fluidic stream 11, 12, 13 and the valve-to-detector conduit 30, and a wash-pump connection time, that is the connection time between the wash pump 40 and the valve-to-detector conduit 30, by controlling switching of the stream-selection valve 20. The fluidic-stream connection time t-Sn−1, t-Sn, t-Sn+1 is fixed and is the same for each fluidic stream 11, 12, 13. Also, the wash-pump connection time t-W is fixed and is a fraction of the fluidic-stream connection time t-Sn−1, t-Sn, t-Sn+1, thereby resulting at least temporarily in a continuous switching at a regular pace. According to another aspect, the controller 90 is configured to adjust a set of parameters of the detector 60 and/or ionization source 61 from a previous configuration Config. n−1, related to the previous fluidic stream Sn−1 to a subsequent configuration Config. n related to the subsequent fluidic stream Sn, and so on from Config. n to Config. n+1, during the wash-pump connection time t-W before switching to the subsequent fluidic stream.

In case the controller 90 is configured to control the wash pump 40 to pump wash liquid only during the wash-pump connection time t-W, part of the wash-pump connection time t-W may be needed for starting and stopping the pump action by the wash pump 40, eventually requiring a slightly longer wash-pump connection time t-W in order to compensate for this time lag, while still achieving the same wash effect. In case the controller 90 is configured to control the wash pump 40 to pump wash liquid continuously, while directing wash liquid to waste during the fluidic-stream connection time, the full wash-pump connection time t-W may be used for washing, making possible to eventually reduce the wash-pump connection time t-W while still achieving the same wash effect.

Figure 4:
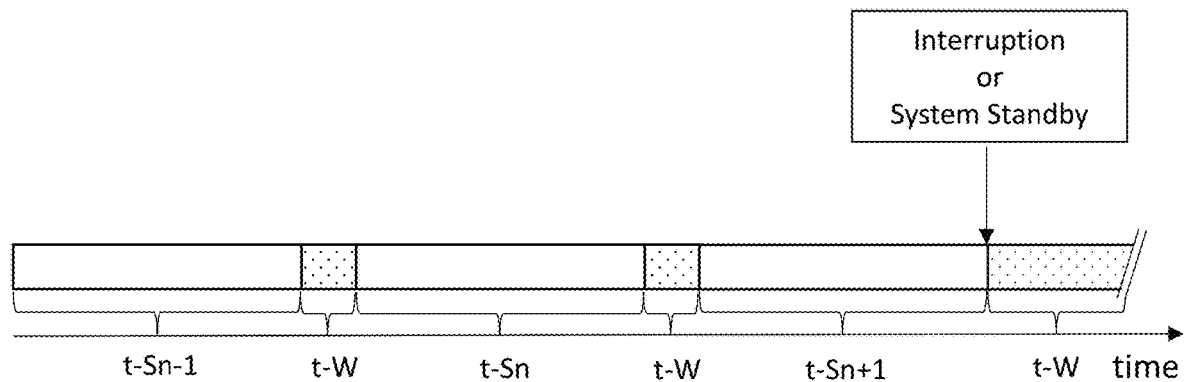
FIG. 4 is a variation of the method of FIG. 3 including prolonged washing.

FIG. 4, which is an adaptation of FIG. 3, shows another aspect of the analytical system and method, according to which the controller 90 is configured to extend the wash-pump connection time t-W while pumping of wash liquid through the valve-to-detector conduit 30 in case of interrupted switching between fluidic streams or in case of system standby. Depending on the duration of the interruption or system standby time, the controller 90 may be configured to control the wash pump 40 to pump wash liquid continuously or at intervals, eventually reducing the flow rate, as long as the valve-to-detector conduit 30 is prevented from drying out.

FIG. 5 shows an example of the effect that can be achieved by washing between consecutive fluidic streams, under certain conditions. In particular, FIG. 5 shows two superimposed series of chromatographs obtained by continuously measuring liquid flows out of the valve-to-detector conduit 30 by coupling the valve-to-detector conduit 30 to a mass spectrometer via an ESI source. In the first series 70, liquid flow from a first fluidic stream S1 is followed directly by liquid flow from a second fluidic stream S2 and again from the first fluidic stream S1. The first liquid flow from the first fluidic stream S1 is a continuous infusion of a reference blank solution acetonitrile:water with a volume ratio of 5:95, providing a stable and regular background signal. The second liquid flow from the second fluidic stream S2 is the same acetonitrile:water solution with a volume ratio of 5:95 containing testosterone at a concentration of 50 pg/mL and generating an enhanced and noisy background signal compared to the reference signal. In the second series 80, the sequence of liquid flows and the solutions used are the same as for series 70, except that a wash liquid W is pumped through the valve-to-detector conduit 30 between S1 and S2, and between S2 and S1. The wash liquid used is water:methanol with a volume ratio of 50:50, and the wash time or wash-pump connection time t-W is 1.2 seconds, that is a fraction of the fluidic-stream connection time t-S2 of 28.2 seconds for S2 in the second series 80. The flow rate of the fluidic streams S1, S2 is 100 µL/min whereas the flow rate of the wash liquid is 1 mL/min. It is also noted that the fluidic-stream connection time t-S2 for S2 in the first series 70 is longer than in the second series 80, as part of the total time is used for washing in the second series 80. In other words, t-S2 in the first series 70 is equal to t-S2+t-W in the second series 80. Also, the fluidic-stream connection time for the second t-S1 in the first series 70 is equal to t-S1+t-W in the second series 80. In other words the start of the fluidic-stream connection times t-S2 and t-S1 are delayed by t-W in the second series 80 versus the first series 70, while their end is the same in the first series 70 and the second series 80.

Importantly, it can be observed in FIG. 5 that when switching from the fluidic stream S2 with an elevated analyte concentration to the fluidic stream S1 with the reference solution, there is a significant difference between the first series 70 and the second series 80. In particular, in the first series 70, it takes a much longer time for the S1 background signal after S2 to return to the same level as for S1 before S2. On the contrary, by introducing the wash step in the second series 80 between S2 and S1, the S1 background signal returns at once to the same level as for S1 before S2. Thus the apparent loss of time spent for washing t-W is not only by far compensated but can result in additional time gain due to a much quicker signal stabilization (clearance time).

Figure 6A:
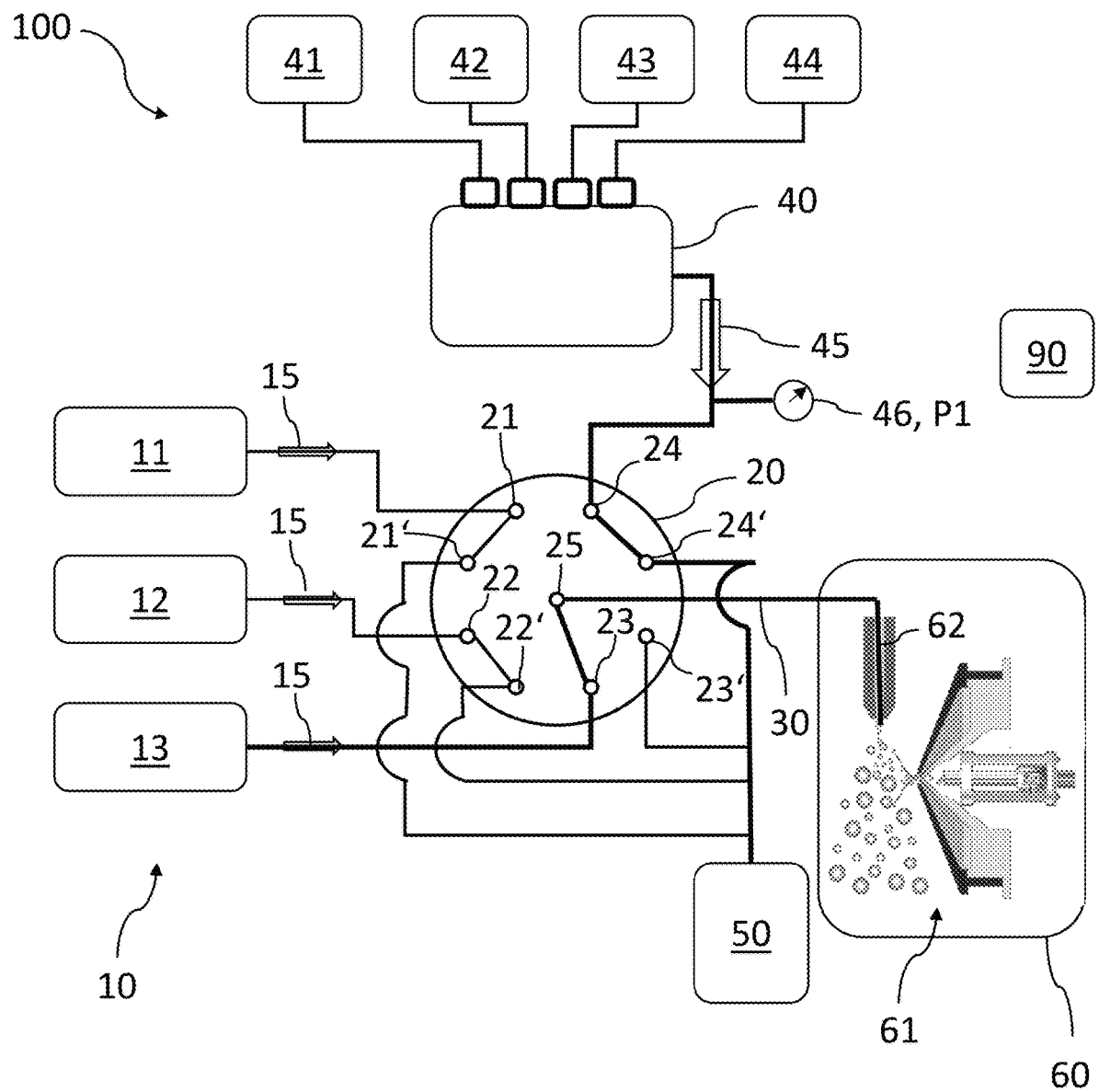
FIG. 6A shows schematically the same analytical system of FIG. 2 comprising a pressure gauge and a first step of a method of determining clogging based on liquid pressure determination.
Figure 6B:
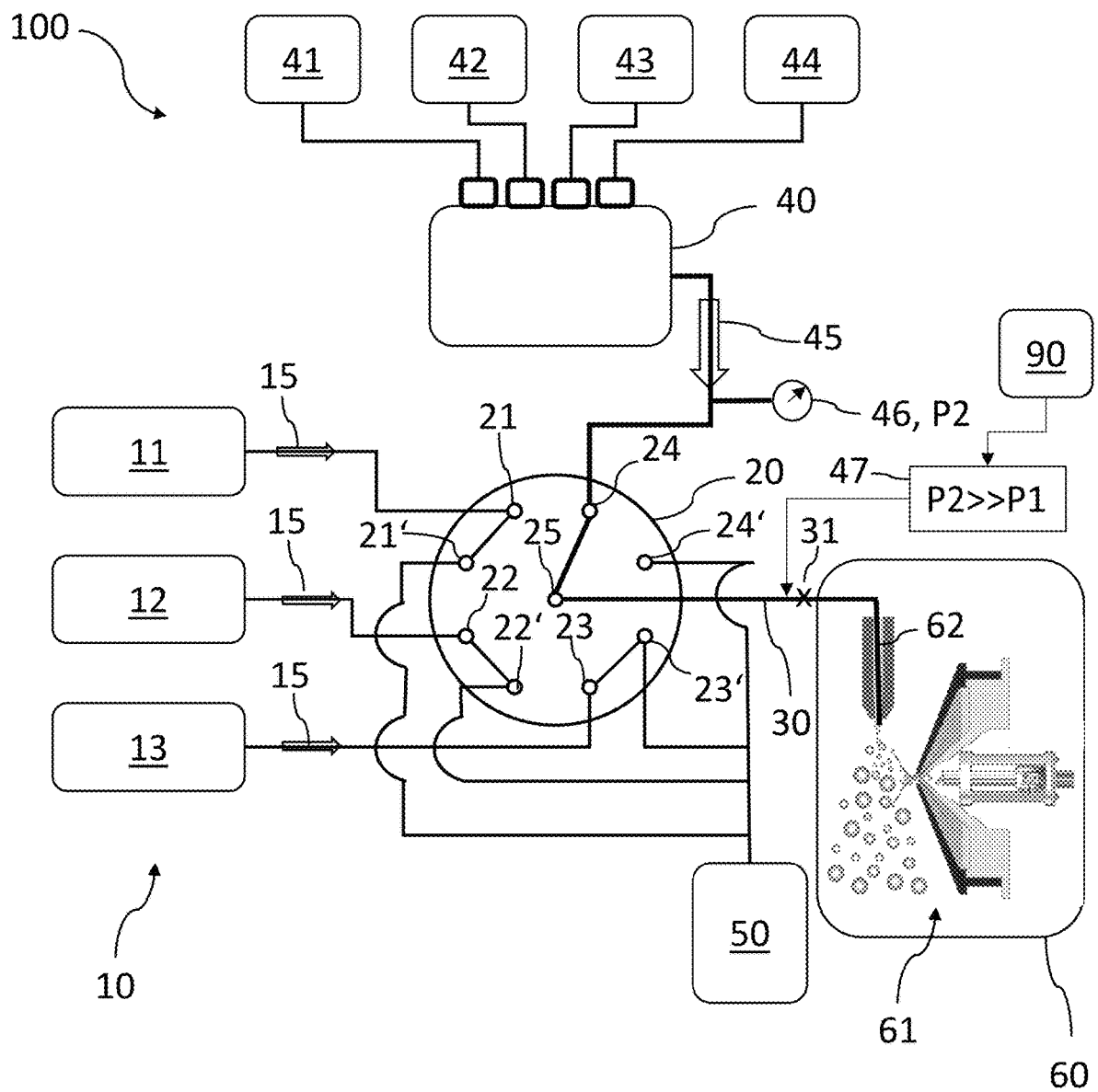
FIG. 6B shows schematically the same analytical system and continuation of the method of FIG. 6A.

FIG. 6A and FIG. 6B taken together schematically show the same analytical system 100 of FIG. 2 comprising a pressure gauge 46 and a method of automatically determining clogging by the controller 90 based on liquid pressure determination. In particular, the pressure gauge 46 is located between the wash pump 40 and the stream-selection valve 20, and the controller 90 is configured to compare a liquid pressure P2 determined during the wash-pump connection time (t-W), in FIG. 6B, with a liquid pressure P1 determined when the wash pump 40 is fluidically connected to waste 50, in FIG. 6A, and based on such comparison 47, e.g. by determining that P2 is significantly greater than P1, to determine whether there is a clogging 31 in the valve-to-detector conduit 30 (FIG. 6B).

In the preceding specification, numerous specific details are set forth in order to provide a thorough understanding of the present disclosure. It will be apparent, however, to one having ordinary skill in the art, that the specific detail need not be employed to practice the present teaching. In other instances, well-known materials or methods have not been described in detail in order to avoid obscuring the present disclosure.

Particularly, modifications and variations of the disclosed embodiments are certainly possible in light of the above description. It is therefore to be understood, that within the scope of the appended claims, the invention may be practiced otherwise than as specifically devised in the above examples.

Reference throughout the preceding specification to "one embodiment", "an embodiment", "one example" or "an example", "one aspect" or "an aspect" means that a particular feature, structure or characteristic described in connection with the embodiment or example or aspect is included in at least one embodiment. Thus, appearances of the phrases "in one embodiment", "in an embodiment", "one example" or "an example", "one aspect" or "an aspect" in various places throughout this specification are not necessarily all referring to the same embodiment or example or aspect.

Furthermore, the particular features, structures, or characteristics may be combined in any suitable combinations and/or sub-combinations in one or more embodiments or examples or aspects.

The invention claimed is:

1. An analytical system comprising a liquid chromatographic (LC) system comprising:
   a plurality of fluidic streams alternately connectable to a common detector via a stream-selection valve connected to the detector via a valve-to-detector conduit, wherein the analytical system further comprises a wash pump fluidically connected to the stream-selection valve and configured to connect to the valve-to-detector conduit between two consecutive fluidic streams in order to wash liquid from a previous fluidic stream out of the valve-to-detector conduit before liquid from a subsequent fluidic stream enters the valve-to-detector conduit,
   wherein the analytical system comprises a controller configured to manage a fluidic-stream connection time (t-Sn−1, T-Sn, t-Sn+1), that is the connection time between each fluidic stream (Sn−1, Sn, Sn+1) and the valve-to-detector conduit, and a wash-pump connection time (t-W), that is the connection time between the wash pump and the valve-to-detector conduit, by controlling switching of the stream-selection valve, and
   wherein the controller is configured to adjust a set of parameters of the detector and/or ionization source from a previous configuration related to the previous fluidic stream to a subsequent configuration related to the subsequent fluidic stream during the wash-pump connection time (t-W) before switching to the subsequent fluidic stream.

2. The analytical system according to claim 1 wherein the detector is a mass spectrometer connected to the valve-to-detector conduit via an ionization source.

3. The analytical system according to claim 2 wherein the ionization source comprises a sprayer capillary that forms part of the valve-to detector conduit.

4. The analytical system according to claim 1 wherein the wash pump is configured to pump a wash liquid through the valve-to-detector conduit at a flow rate higher than a flow rate of the fluidic streams.

5. The analytical system according to claim 1 wherein the controller is configured to control the wash pump such that wash liquid is pumped only during the wash-pump connection time.

6. The analytical system according to claim 1 wherein the fluidic-stream connection time is fixed and is the same for each fluidic stream and wherein the wash-pump connection time is fixed and is a fraction of the fluidic-stream connection time, thereby resulting at least temporarily in a continuous switching at a regular pace.

7. An analytical system comprising a liquid chromatographic (LC) system comprising:
   a plurality of fluidic streams alternately connectable to a common detector via a stream-selection valve connected to the detector via a valve-to-detector conduit, wherein the analytical system further comprises a wash pump fluidically connected to the stream-selection valve and configured to connect to the valve-to-detector conduit between two consecutive fluidic streams in order to wash liquid from a previous fluidic stream out of the valve-to-detector conduit before liquid from a subsequent fluidic stream enters the valve-to-detector conduit
   wherein the analytical system comprises a controller configured to manage a fluidic-stream connection time (t-Sn−1, T-Sn, t-Sn+1), that is the connection time between each fluidic stream (Sn−1, Sn, Sn+1) and the valve-to-detector conduit, and a wash-pump connection time (t-W), that is the connection time between the wash pump and the valve-to-detector conduit, by controlling switching of the stream-selection valve, and
   wherein the controller is configured to adjust a set of parameters of the detector and/or ionization source from a previous configuration related to the previous fluidic stream to a subsequent configuration related to the subsequent fluidic stream during the wash-pump connection time (t-W) before switching to the subsequent fluidic stream, and
   wherein the set of parameters comprises any one or more of a curtain gas pressure, a nebulizer gas pressure, an auxiliary gas pressure, a sprayer capillary voltage, a sampling capillary voltage.

8. An analytical system comprising a liquid chromatographic (LC) system comprising:
   a plurality of fluidic streams alternately connectable to a common detector via a stream-selection valve connected to the detector via a valve-to-detector conduit, wherein the analytical system further comprises a wash pump fluidically connected to the stream-selection valve and configured to connect to the valve-to-detector conduit between two consecutive fluidic streams in order to wash liquid from a previous fluidic stream out of the valve-to-detector conduit before liquid from a subsequent fluidic stream enters the valve-to-detector conduit, wherein the analytical system comprises a controller configured to manage a fluidic-stream connection time (t-Sn−1, T-Sn, t-Sn+1), that is the connection time between each fluidic stream (Sn−1, Sn, Sn+1) and the valve-to-detector conduit, and a wash-pump connection time (t-W), that is the connection time between the wash pump and the valve-to-detector conduit, by controlling switching of the stream-selection valve, and wherein the controller is configured to extend the wash-pump connection time while pumping of wash liquid through the valve-to-detector conduit in case of interrupted switching between fluidic streams or in case of system standby.

9. An analytical system comprising a liquid chromatographic (LC) system comprising:
a plurality of fluidic streams alternately connectable to a common detector via a stream-selection valve connected to the detector via a valve-to-detector conduit,
wherein the analytical system further comprises a wash pump fluidically connected to the stream-selection valve and configured to connect to the valve-to-detector conduit between two consecutive fluidic streams in order to wash liquid from a previous fluidic stream out of the valve-to-detector conduit before liquid from a subsequent fluidic stream enters the valve-to-detector conduit,
wherein the analytical system comprises a controller configured to manage a fluidic-stream connection time (t-Sn−1, T-Sn, t-Sn+1), that is the connection time between each fluidic stream (Sn−1, Sn, Sn+1) and the valve-to-detector conduit, and a wash-pump connection time (t-W), that is the connection time between the wash pump and the valve-to-detector conduit, by controlling switching of the stream-selection valve, and
a pressure gauge between the wash pump and the stream-selection valve for determining a liquid pressure, wherein the controller is configured to compare a liquid pressure determined during the wash-pump connection time with a liquid pressure determined when the wash pulp is fluidically connected to waste and based on such comparison to determine whether there is a clogging in the valve-to-detector.

10. An automated analytical method comprising: alternately connecting a plurality of fluidic streams of a liquid chromatographic system to a common detector via a stream-selection valve connected to the detector via a valve-to-detector conduit, the method further comprising fluidically connecting a wash pump to the valve-to-detector conduit via the stream-selection valve between two consecutive fluidic streams and washing liquid from a previous fluidic stream out of the valve-to-detector conduit before liquid from a subsequent fluidic stream enters the valve-to-detector conduit,
automatically managing a fluidic-stream connection time, that is the connection time between each fluidic stream and the valve-to-detector conduit, and a wash-pump connection time, that is the connection time between the wash pump and the valve-to-detector conduit, by controlling switching of the stream-selection valve, and
adjusting a set of parameters of the detector and/or of an ionization source in case the detector is a mass spectrometer from a previous configuration related to the previous fluidic stream to a subsequent configuration related to the subsequent fluidic stream during the wash-pump connection time before switching to the subsequent fluidic stream.

11. An automated analytical method comprising alternately connecting a plurality of fluidic streams of a liquid chromatographic system to a common detector via a stream-selection valve connected to the detector via a valve-to-detector conduit, the method further comprising fluidically connecting a wash pump to the valve-to-detector conduit via the stream-selection valve between two consecutive fluidic streams and washing liquid from a previous fluidic stream out of the valve-to-detector conduit before liquid from a subsequent fluidic stream enters the valve-to-detector conduit,
automatically managing a fluidic-stream connection time, that is the connection time between each fluidic stream and the valve-to-detector conduit, and a wash-pump connection time, that is the connection time between the wash pump and the valve-to-detector conduit, by controlling switching of the stream-selection valve, and
extending the wash-pump connection time while pumping of wash liquid through the valve-to-detector conduit in case of interrupted switching between fluidic streams or in case of system standby.

12. An automated analytical method comprising:
alternately connecting a plurality of fluidic streams of a liquid chromatographic system to a common detector via a stream-selection valve connected to the detector via a valve-to-detector conduit, the method further comprising fluidically connecting a wash pump to the valve-to-detector conduit via the stream-selection valve between two consecutive fluidic streams and washing liquid from a previous fluidic stream out of the valve-to-detector conduit before liquid from a subsequent fluidic stream enters the valve-to-detector conduit,
automatically managing a fluidic-stream connection time, that is the connection time between each fluidic stream and the valve-to-detector conduit, and a wash-pump connection time, that is the connection time between the wash pump and the valve-to-detector conduit, by controlling switching of the stream-selection valve, wherein the method comprises
comparing a liquid pressure between the wash pump and the stream-selection valve determined during the wash-pump connection time with a liquid pressure determined when the wash pump is fluidically connected to waste and based on such comparison determining whether there is a clogging in the valve-to-detector conduit.

\* \* \* \* \*